3,553,306
FILMS AND FILAMENTS HAVING ION-EXCHANGE PROPERTIES AND PROCESS FOR MAKING SAME

John Armistead Church, Princeton Junction, N.J., assignor to American Can Company, New York, N.Y., a corporation of New Jersey
No Drawing. Filed Oct. 24, 1969, Ser. No. 869,360
Int. Cl. B29d 7/02; C08h 15/00; D01f 3/32
U.S. Cl. 264—218                                                    21 Claims

ABSTRACT OF THE DISCLOSURE

Films and fibers or filaments having ion-exchange properties are made by the viscose process from cellulosic material to which certain ionic polymers have been graft polymerized prior to the regeneration of the cellulosic material.

---

According to the present invention, films and fibers or filaments having ion-exchange properties are made by first preparing cellulose grafted with synthetic, water soluble, ionic polymers and/or copolymers and then forming a film or fiber from the cellulose graft copolymer by means of the viscose process. Such films and fibers as are obtained by the present process have exceptional ion exchange properties which make them eminently suitable, among other things, for use in membrane separation processes such as ultrafiltration, electrodialysis and reverse osmosis. The physical and mechanical characteristics of the products of the present invention also render them exceptionally well suited for the above separation processes, which are of prime importance in such fields as stream pollution abatement, water desalination, concentration of food products and in medical fields employing dialysis devices such as in artificial kidneys and the like.

It is known to graft polymerize a synthetic polymer onto a preformed cellophane film or rayon filament, but by the very nature of such processes the copolymer can only be grafted to the outer surfaces of the film or filament or in an otherwise non-uniform fashion, whereas according to the present invention the films and filaments produced contain the grafted copolymer uniformly throughout the supermolecular structure thereof so that the overall effectiveness of such films in membrane separation processes is much greater. For a general discussion of the advantages which would be obtained if cellulose could be grafted with appropriate polymers before film and/or fiber production, see Z. A. Rogovin, "Chemical Modification of Cellulosic Man-Made Fibers," Svensk Papperstidning 70: 799–804 (1967), especially paragraph 5 on page 801. The present invention has succeeded for the first time in producing an extended form cellulose material from cellulose pregrafted with an ion-exchange polymer.

Films of the present invention are less brittle than known ion-exchange films or membranes and are therefore less likely to crack during use. Also, the present films are not thermoplastic and may therefore be used in a warm environment. Further advantages of the present product are its relative chemical inertness to dilute acids and alkalies, its water insolubility and its relatively high ion-exchange capacity. In the past, cellulosic membranes having a relatively high ion-exchange capacity were substantially water soluble so as to be of substantially no use in aqueous systems.

Generally, according to the present invention, a cellulosic material such as preferably cotton linters or wood pulp in an aqueous suspension is treated with a synthetic monomer which will, upon polymerization, produce a polymer, some of which is grafted to the cellulosic material. If the grafted polymer does not have ion-exchange characteristics, it is hydrolyzed to form an ionic polymer. After removal of excess ungrafted polymer, the graft copolymers of cellulose are, according to the present invention, subjected to the viscose process by treating with caustic soda, aging, and treating with $CS_2$ to xanthate the swollen cellulosic graft copolymer material. After suitable mixing, the mixture is dissolved by further addition of caustic soda and aged. The solution may then be shaped into an extended form such as a fiber or filament or cast as a film or membrane and submerged in a regeneration solution of sodium sulfate and sulfuric acid to produce membranes or it may be forced through a spinneret into a regeneration solution to form filaments of cellulose graft polymers having ion-exchange properties.

It has been found that graft copolymers of cellulose may be prepared by treating the cellulosic material with alkali acrylate or alkali alkacrylate and graft polymerizing said compounds or a mixture thereof directly onto the cellulosic material. However, it has been found that more suitable graft copolymers of the cellulose can be prepared by employing acrylonitrile, alkacrylonitrile or mixtures thereof to form the initial cellulose graft copolymer of polyacrylonitrile, polyalkacrylonitrile or a copolymer of acrylonitrile and alkacrylonitrile or a mixture of all three and subsequently hydrolyzing with alkali hydroxide to convert the grafted polymers and/or copolymers to the carboxylate derivatives thereof. The presence of the carboxylate groups provides the desirable ion-exchange characteristics in the final product. In addition to the acrylate and alkacrylate polymers and copolymers mentioned above, other water soluble polymers may be employed such as polyvinyl alcohol, polyvinylpyrrolidone and polyacrylamide as well as water soluble polymers of certain vinyl monomers. Although wood pulp may be used as the basic cellulosic material, it has been found that the use of cotton linters produces membranes having better physical characteristics because of the higher molecular weight of the cotton linters compared to wood pulp.

As stated above, the ionic graft copolymers of cellulose may be prepared directly from a cellulosic material. One manner of doing so is as follows:

EXAMPLE I

A spruce sulfite alpha-cellulose and sodium acrylate were mixed in concentrated NaOH, using a persulfate-thiosulfate initiator for the polymerization of the sodium acrylate and for the grafting thereof onto the cellulose molecules. After a suitable reaction time, the cellulose material was thoroughly washed with water to remove ungrafted poly (sodium acrylate). The cellulose graft copolymer had increased in weight by 17% due to the grafted polymer. The fibers were converted to a film by the viscose process as follows: Four and one-half grams of fibers were treated for five minutes with 75 ml. of 18% NaOH and then filtered and pressed with a rubber membrane to five times their initial weight. The mass was picked apart, added to a glass jar, and 2.5 ml. $CS_2$ was added. The jar was sealed and mechanically rotated for three hours; then the xanthated orange mass was brought into solution by the gradual addition of 70 ml. of 1.2 N NaOH over a two-hour period with agitation. The viscose solution was allowed to sit sixty-five hours, after which time a few undissolved lumps had settled out. Films were cast from the clear orange supernatant liquid on a glass plate and regenerated in a bath of 17% $Na_2SO_4$-5% $H_2SO_4$. The films were thoroughly washed in water and then plasticized in 5% glycerin. They were dried while stretched over the top of Buchner funnels and secured with rubber bands. The films were smooth and mechanically uniform.

For comparison, films were cast from viscose prepared in the same fashion from unmodified spruce sulfite alpha-cellulose. The films were similar in outward appearance to the films prepared from the graft copolymer.

Infrared spectra were obtained from the two different films. The film made from the unmodified cellulose showed no absorption in the carboxylic acid and carboxylate regions of the spectrum; however, the film made from the graft copolymer showed strong absorption in these regions, indicating the presence of carboxylic acid groups and carboxylate ions due to the presence of poly(acrylic acid) and poly(sodium acrylate) grafted to the cellulose. The presence of both the acid and the sodium salt arose because of the large amounts of both $H^+$ and $Na^+$ ions in the regenerating bath.

A sample of the film from the grafted cellulose was soaked in 0.1 N NaOH to convert any free carboxylic acid groups to the sodium salt form. The film was then washed in water and dried. The infrared spectrum of this film showed no absorption in the carboxylic acid region but very strong absorption in the carboxylate region. The same piece of film was then soaked in 0.1 N HCl to convert all the carboxylate groups back to the carboxylic acid form. After washing and drying, the infrared spectrum of the film showed very strong absorption in the carboxylic acid region but no absorption in the carboxylate region. These data confirm the existence of many insoluble ion-exchanging carboxyl groups arising from the polyacrylate polymer chemically grafted to the cellulose.

The cellulose graft film copolymer prepared as in Example I has excellent ion-selective properties and can thus be used as a barrier between two ionic aqueous solutions and can be used in water desalination. Whenever desired the acrylate polymer can be converted to the acid form, poly(acrylic acid), or to a different salt form such as poly(calcium acrylate). The use of polyvalent ions, such as calcium, will cross-link the polyacrylate chains so that a stiffening effect would be obtained, if desired.

As mentioned above, more suitable graft copolymers of cellulose may be prepared from cotton linters because of their high molecular weight compared to wood pulp by first graft polymerizing acrylonitrile or the like to cotton linters and then imparting the desired ion-exchange properties thereto by hydrolyzing with caustic soda or the like. Such a method is described below in Example II.

EXAMPLE II

Polyacrylonitrile was graft polymerized onto a cotton linters cellulose substrate in an aqueous suspension of the fibers using a redox initiator system, with the concurrent formation of some physically occluded polyacrylonitrile homopolymer. One method which might be used is described in U.S. Pat. No. 3,083,118. The entire produce was hydrolyzed in a hot solution of sodium hydroxide to convert the polyacrylonitrile to poly(sodium acrylate). The grafted polymer remained grafted to the cellulose while the ungrafted poly(sodium acrylate) was largely washed out during processing. Any remaining ungrafted polymer was removed by thorough washing with hot water and the cellulose graft copolymer was then dried in a substantially pure state. This conversion of the polyacrylonitrile to the poly(sodium acrylate) may be carried out in a manner as described in U.S. Pat. No. 3,194,727.

This product was then subjected to the viscose process as follows:

Eighteen g. of dry cellulose grafted with poly(sodium acrylate) was steeped thirty minutes in 300 ml. of 17.5% NaOH. The swollen fibers were filtered as dry as possible on a coarse filter with the use of a rubber membrane and then pressed in a hydraulic press between folded canvas squares to a weight of about 88 g. The pressed fibers were pulled apart to give pasty crumbs; this material, termed alkali cellulose, was then aged in a sealed jar for sixty-three hours. After the aging step, 6 ml. of reagent $CS_2$ was added to the alkali cellulose in portions with mixing, and the sealed jar was placed on a rotator with slow speed rotation for three hours.

The orange xanthated material was mixed with 186 ml. of 5% NaOH and stirred in the xanthating jar with a propeller-type stirrer at relatively low speed. Nearly complete solution of the material occurred in four to five hours to give an orange viscous syrup, termed viscose. The viscose was aged for twenty-one hours at room temperature and then was clarified by high speed centrifugation.

Membranes were cast on a glass plate using a glass drawbar around the ends of which was wrapped one layer of No. 24 copper wire. Immediately after casting, the glass plate was quickly immersed in a large tray containing a solution of 17% anhydrous sodium sulfate and 5% sulfinic acid (at room temperature) in sufficient quantity to rapidly cover the entire plate upon immersion. The nascent membranes were soon decolorized and floated free of the plate in one to two minutes. They were allowed to remain in the bath a total of three minutes. The membranes were then placed in a tray containing hot water and were allowed to soak fifteen minutes. They were then soaked ten minutes in a 2% anhydrous sodium sulfide solution followed by another fifteen minutes soak in hot water. The membranes were then plasticized briefly in a 5% glycerin solution, blotted dry, and stretched over a circular aperture to dry while secured with rubber bands.

Membranes prepared by this method have, typically, a poly(sodium acrylate) content of 20% and an ion-exchange capacity of 2.07 milliequivalents/ram. The ion-exchange capacity achieved depends, of course, on the composition of the original graft copolymer. These analytical results remain constant after prolonged soaking of the membranes in distilled water.

For comparison, films were made from a physical mixture of cellulose and enough separately prepared pure poly(sodium acrylate) to give a final content of 20% if all the poly(sodium acrylate) were retained. Analysis showed that these films retained a 5% content of physically occluded poly(sodium acrylate) immediately after casting; on prolonged soaking in distilled water, this decreased to less than 3%, indicating that it is not feasible to produce a cellulose membrane with a high nonleachable content of an ionic polymer by physical mixture blending.

The ion-exchange capabilities of the above membranes were demonstrated as follows:

The infrared spectrum of a membrane shows either a peak at 1550 cm.$^{-1}$ (salt or a carboxyl group) or a peak at 1730 cm.$^{-1}$ (free carboxylic acid) or sometimes both of these, depending on the pH of the last solution it contacted. Acid solutions convert the film to the free acid, and alkaline solutions cause the formation of the carboxylate salt form. The same piece of membrane can be converted back and forth to the different forms any number of times at will, with consequent alternation of the above infrared bands.

Pure poly(sodium acrylate) has an ash content of 32.9% when converted completely to sodium oxide. Thus, the poly(sodium acrylate) content thereof in a membrane can be readily determined by ashing the sample and weighing the residue; the poly(sodium acrylate) content is directly proportional to the ash content. A membrane in the free carboxylic acid form has essentially zero ash, as expected, because no metal is present and hence no metal oxide residue remains after ignition. Once the poly(sodium acrylate content of the membrane is known, the ion-exchange capacity is easily calculated because pure poly(sodium acrylate) has a capacity of 10.6 milliequivalents/gram.

A membrane in the free acid form may be subjected to potentiometric titration by suspending in water and adding dilute sodium hydroxide slowly with a buret. The pH of the solution is constantly monitored with a pH meter. The curve of pH versus amount of sodium hydroxide added is typical of that observed when a weak acid (carboxyl) is titrated with a strong base (sodium hydroxide).

Knowing the weight of the membrane and the amount of sodium hydroxide added to reach the equivalence point, the ion-exchange capacity of the membrane can be calculated.

Using the above analytical methods, the poly(sodium acrylate) content of a typical membrane, as previously stated, was found to be 20% and the corresponding ion-exchange capacity to be 2.07 milliequivalents/gram. For comparison, typical commercial ion-exchange membranes have capacities of one to three milliequivalents/gram.

EXAMPLE III

This example shows the synthesis of a cellulosic ion-exchange membrane containing poly(sodium methacrylate) as the grafted ion-exchange polymer. A sample of southern pin kraft pulp grafted with polymethacrylonitrile (apparent polymer add-on, 72%) was hydrolyzed by the general method previously described in Example II. This converted the grafted polymethacrylonitrile to grafted poly(sodium methacrylate) and also removed most of the accompanying ungrafted homopolymer. A membrane was then made from the grafted pulp fibers by the viscose process as outlined in Example II. The finished membrane, in the dry sodium salt form, had an ash content of 4.55% corresponding to a poly(sodium methacrylate) content of 16.0% and an ion-exchange capacity of 1.47 milliequivalents/gram. When converted to the free acid form in 0.1 N HCl, the membrane had zero ash, as expected.

EXAMPLE IV

This example shows the synthesis of a cellulosic ion-exchange membrane containing both poly(sodium acrylate) and poly(sodium methacrylate), as well as possibly a copolymer of the two, as the grafted ion-exchange polymers. A sample of southern pin kraft pulp grafted with polyacrylonitrile, polymethacrylonitrile, and/or possibly a copolymer of the two, was hydrolyzed by the general method previously described in Example II. The grafted nitrile polymers were thereby converted to the corresponding acrylate or methacrylate polymers in the sodium salt form, with concurrent removal of most of the accompanying ungrafted homopolymers. A membrane was then made from the grafted pulp fibers by the viscose process as described in Example II. The finished membrane in the dry sodium salt form had an ash content of 7.58%, corresponding to an ion-exchange capacity of 2.44 milliequivalents/gram.

As used in the accompanying claims, the term "extended form" is intended to include not only a film but also a fiber or filament.

What is claimed is:

1. A process for producing a material in extended form having ion-exchange properties comprising treating a cellulosic material to which has been grafted an ionic polymer selected from the group consisting of a polyacrylate, a polyalkacrylate, copolymers thereof and mixtures thereof, with caustic soda to swell the fibers of the cellulose graft polymer, treating said swollen fibers with $CS_2$ to xanthate the fibers, dissolving said xanthated fibers with additional caustic soda to form a viscose-like solution, shaping said solution into a desired extended form, immersing said shaped form in a bath capable of regenerating said viscose-like solution to a substantially solid form and washing and drying the product.

2. A process as claimed in claim 1 wherein the grafted ionic polymer is the sodium derivative thereof.

3. A process as claimed in claim 1 wherein the cellulosic material is spruce sulfite alpha cellulose.

4. A process as claimed in claim 1 wherein the cellulosic material is cotton linters.

5. A process as claimed in claim 1 wherein the cellulose graft copolymer is obtained by treating the cellulosic material with sodium acrylate in concentrated NaOH in the presence of a persulfate-thiosulfate polymerization initiator.

6. A process as claimed in claim 1 wherein the cellulose graft copolymer is obtained by treating a cellulosic material in aqueous suspension with a compound selected from the group consisting of acrylonitrile, alkacrylonitrile and mixtures thereof in the presence of a redox catalyst system, hydrolyzing the product in a solution of caustic soda to convert the polymeric material to the sodium derivative thereof and removing excess ungrafted polymer from the cellulose graft copolymer.

7. A process as claimed in claim 1 and further comprising immersing the regenerated cellulose graft copolymer in an aqueous solution of NaOH to convert any carboxylic acid groups of the polymer resulting from the regeneration step to the sodium carboxylate form.

8. A process as claimed in claim 1 and further comprising immersing the regenerated cellulose graft copolymer in an aqueous solution of HCl to convert carboxylate groups of the polymer to carboxylic acid groups.

9. A cellulose graft copolymer material in extended form prepared by the method of claim 1 and having ion-exchange properties.

10. A process for producing a membrane having ion-exchange properties comprising treating a cellulose material grafted with polyalkaliacrylate with an aqueous solution of NaOH to swell the cellulose fibers, removing excess NaOH solution, aging the swollen fibers, adding $CS_2$ to the aged swollen fibers to xanthate the fibers, adding NaOH solution, mixing to substantially completely dissolve the xanthated material to form a viscose-like solution, aging said viscose-like solution, adjusting the viscosity of said solution by addition of NaOH solution, casting a portion of said solution on a flat plate, immersing said plate in a regeneration bath comprised of sodium sulfate and sulfuric acid, washing the regenerated membrane with water and drying said membrane.

11. A process as claimed in claim 10 wherein the cellulose grafted with polyalkaliacrylate is cellulose grafted with poly(sodium acrylate).

12. A membrane having ion-exchange properties prepared by the process of claim 10 and having an ash content of about 6.6% and an ion-exchange capacity of about 2.07 milliequivalents/gram.

13. A membrane prepared by the process of claim 10 wherein the polyalkaliacrylate is poly(sodium acrylate).

14. A process for producing a membrane having ion-exchange properties comprising treating a cellulose material grafted with polyalkalialkacrylate with an aqueous solution of NaOH to swell the cellulose fibers, removing excess NaOH solution, aging the swollen fibers, adding $CS_2$ to the aged swollen fibers to xanthate the fibers, adding NaOH solution, mixing to substantially completely dissolve the xanthated material to form a viscose-like solution, aging said viscose-like solution, adjusting the viscosity of said solution by addition of NaOH solution, casting a portion of said solution on a flat plate, immersing said plate in a regeneration bath comprised of sodium sulfate and sulfuric acid, washing the regenerated membrane with water and drying said membrane.

15. A process as claimed in claim 14 wherein the cellulose grafted with polyalkalialkacrylate is cellulose grafted with poly(sodium methacrylate).

16. A membrane having ion-exchange properties prepared by the process of claim 14 and having an ash content of about 4.55% and an ion-exchange capacity of about 1.47 milliequivalents/gram.

17. A membrane prepared by the process of claim 14 wherein the polyalkalialkacrylate is poly(sodium methacrylate).

18. A process for producing a membrane having ion-exchange properties comprising treating a cellulose material grafted with polyalkaliacrylate and polyalkalialkacrylate and/or a copolymer thereof with an aqueous solution of NaOH to swell the cellulose fibers, removing excess NaOH solution (aging the swollen fibers, adding $CS_2$ to the aged swollen fibers to xanthate the fibers, adding NaOH solution, mixing to substantially completely dissolve the xanthated material to form a viscose-like solution, aging said viscose-like solution, adjusting the viscosity of said solution by addition of NaOH solution, casting a portion of said solution on a flat plate, immersing said plate in a regeneration bath comprised of sodium sulfate and sulfuric acid, washing the regenerated membrane with water and drying said membrane.

19. A process as claimed in claim 18 wherein the cellulose grafted with polyalkaliacrylate and polyalkalialkacrylate and/or a copolymer thereof is cellulose grafted with poly(sodium acrylate), poly(sodium methacrylate) and/or a copolymer thereof.

20. A membrane having ion-exchange properties prepared by the process of claim 18 and having an ash content of 7.58% and an ion-exchange content of 2.44 milliequivalents/gram.

21. A membrane prepared by the process of claim 18 wherein the polyalkaliacrylate and polyalkalialkacrylate are poly(sodium acrylate) and poly(sodium methacrylate), respectively.

References Cited
UNITED STATES PATENTS
3,083,118   3/1963   Bridgeford _____ 117—47
3,457,198   7/1969   Sobolev _____ 260—2.2

OTHER REFERENCES
Sonnerskog, Acta Chem. Scand. 11, 573–75 (1957).

WILLIAM SHORT, Primary Examiner

M. GOLDSTEIN, Assistant Examiner

U.S. Cl. X.R.

260—2.1, 2.2; 264—187